US007976275B2

(12) United States Patent
Miebach et al.

(10) Patent No.: US 7,976,275 B2
(45) Date of Patent: Jul. 12, 2011

(54) WIND TURBINE ROTOR BLADE ASSEMBLY HAVING AN ACCESS WINDOW AND RELATED METHODS

(75) Inventors: Thomas Miebach, Ballston Spa, NY (US); Shu Ching Quek, Clifton Park, NY (US); Waseem Ibrahim Faidi, Schenectady, NY (US); Chandra Sekher Yerramalli, Schenectady, NY (US); Peggy Lynn Baehmann, Glenville, NY (US); Peter James Fritz, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/871,116

(22) Filed: Aug. 30, 2010

(65) Prior Publication Data

US 2011/0142667 A1 Jun. 16, 2011

(51) Int. Cl.
*B63H 7/00* (2006.01)
(52) U.S. Cl. ....... 416/61; 416/212 R; 416/224; 416/226; 416/229 R; 416/233
(58) Field of Classification Search .................... 416/61, 416/212 R, 213 R, 213 A, 226, 224, 229 R, 416/233; 29/889.7, 889.72, 889.721
See application file for complete search history.

(56) References Cited

U.S. PATENT DOCUMENTS

| 3,667,862 | A | * | 6/1972 | Parr .................................. 416/61 |
| 4,275,994 | A | * | 6/1981 | Underhill, Jr. ................ 416/226 |
| 4,474,536 | A | | 10/1984 | Gougeon et al. |
| 6,638,466 | B1 | * | 10/2003 | Abbott ........................... 264/238 |
| 7,334,989 | B2 | * | 2/2008 | Arelt ................................ 416/2 |
| 7,740,453 | B2 | | 6/2010 | Zirin et al. |
| 2006/0083611 | A1 | * | 4/2006 | Wobben ........................... 416/2 |
| 2008/0069699 | A1 | | 3/2008 | Bech |
| 2009/0162206 | A1 | * | 6/2009 | Zirin et al. ................ 416/223 R |
| 2010/0143148 | A1 | | 6/2010 | Chen et al. |

* cited by examiner

*Primary Examiner* — Igor Kershteyn
(74) *Attorney, Agent, or Firm* — Dority & Manning, P.A.

(57) ABSTRACT

A rotor blade assembly having an access window and methods for assembling a rotor blade are disclosed. The rotor blade assembly may generally include a first shell component and a second shell component. The first shell component may be secured to the second shell component. Additionally, an access region may be defined in the first shell component and/or the second shell component. The access region may generally be configured such that an access window is defined in the rotor blade assembly. The access window may be configured to provide access to the interior of a portion of the rotor blade assembly.

20 Claims, 7 Drawing Sheets

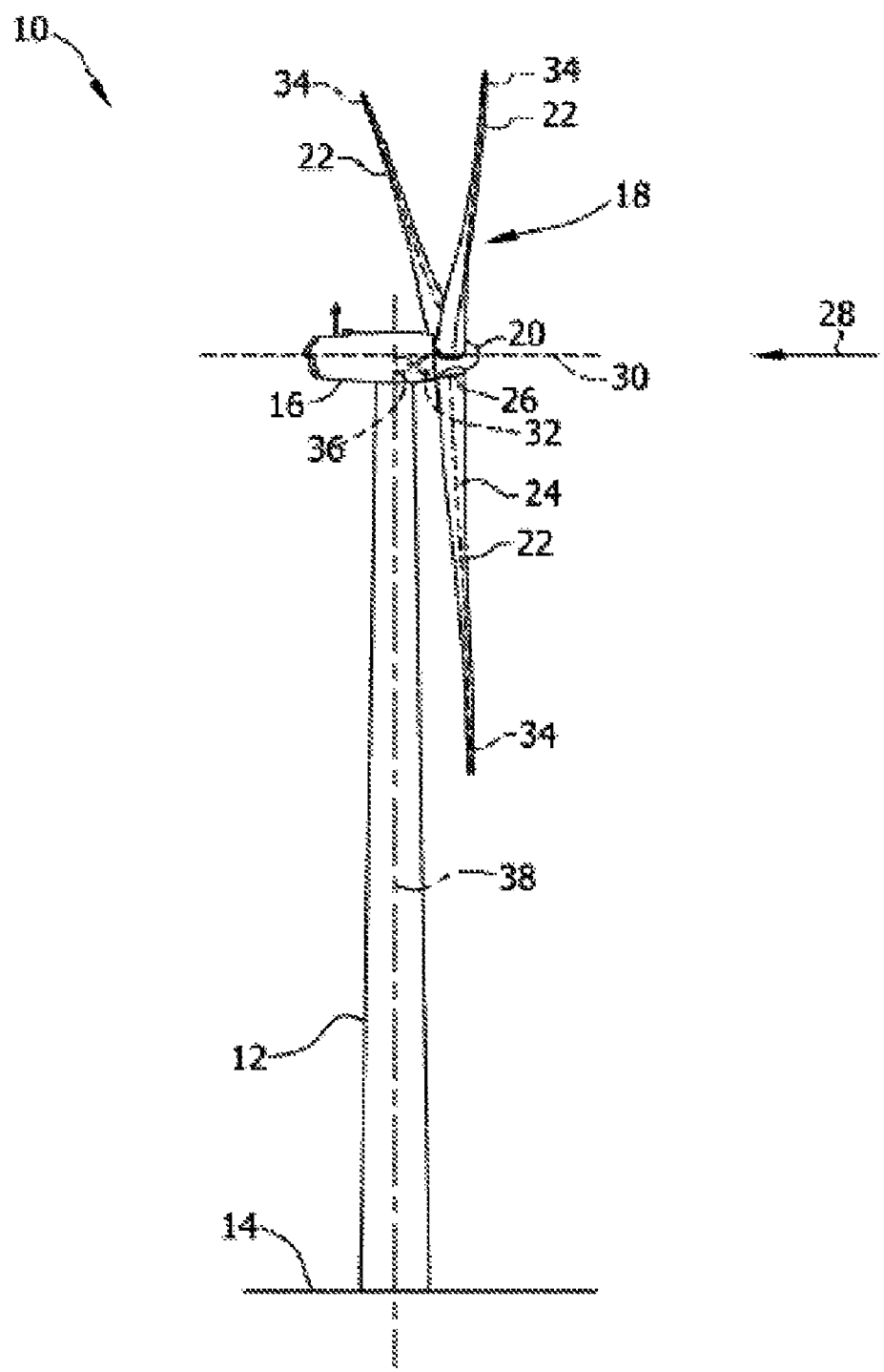
FIG. -1-

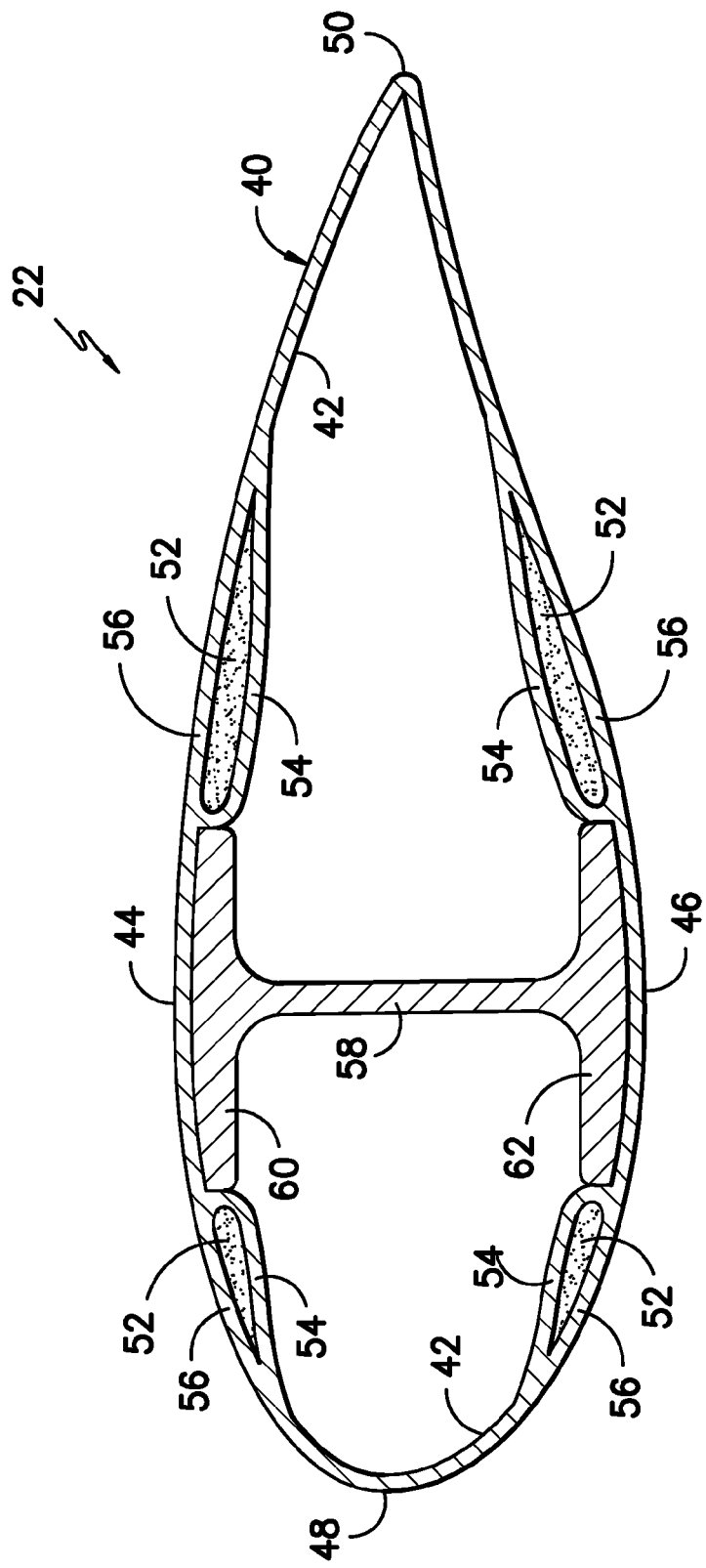
FIG. -2-

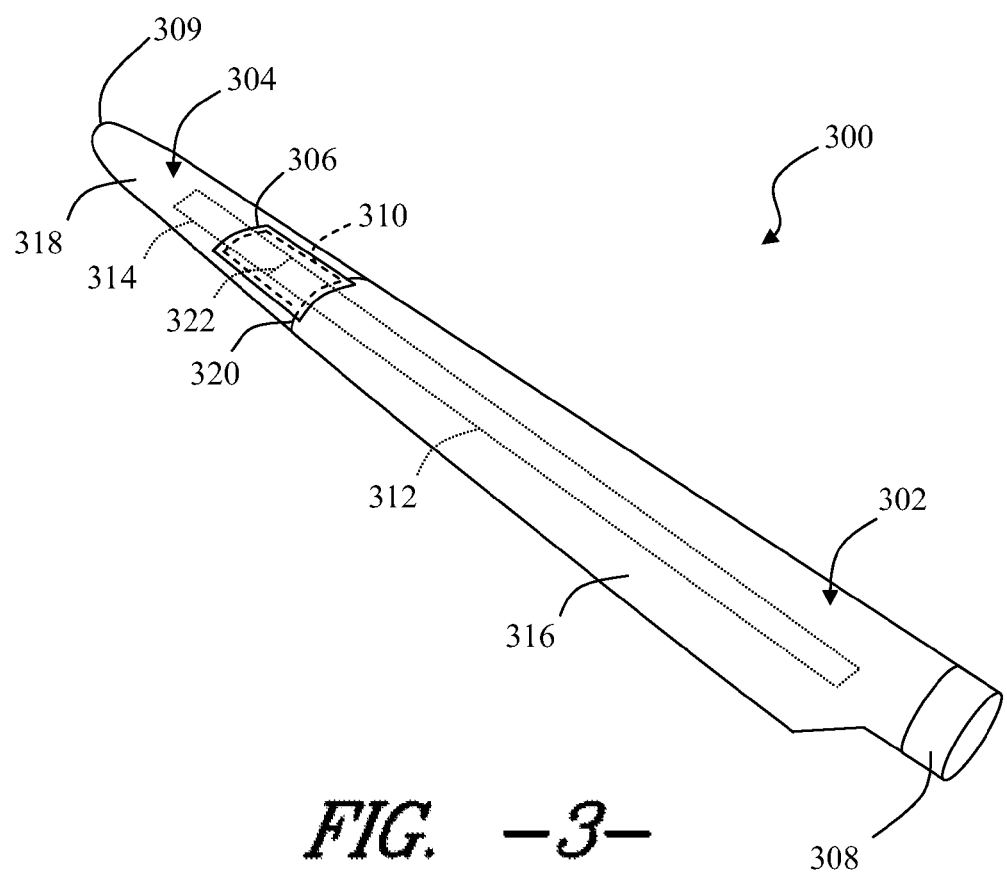
FIG. -3-

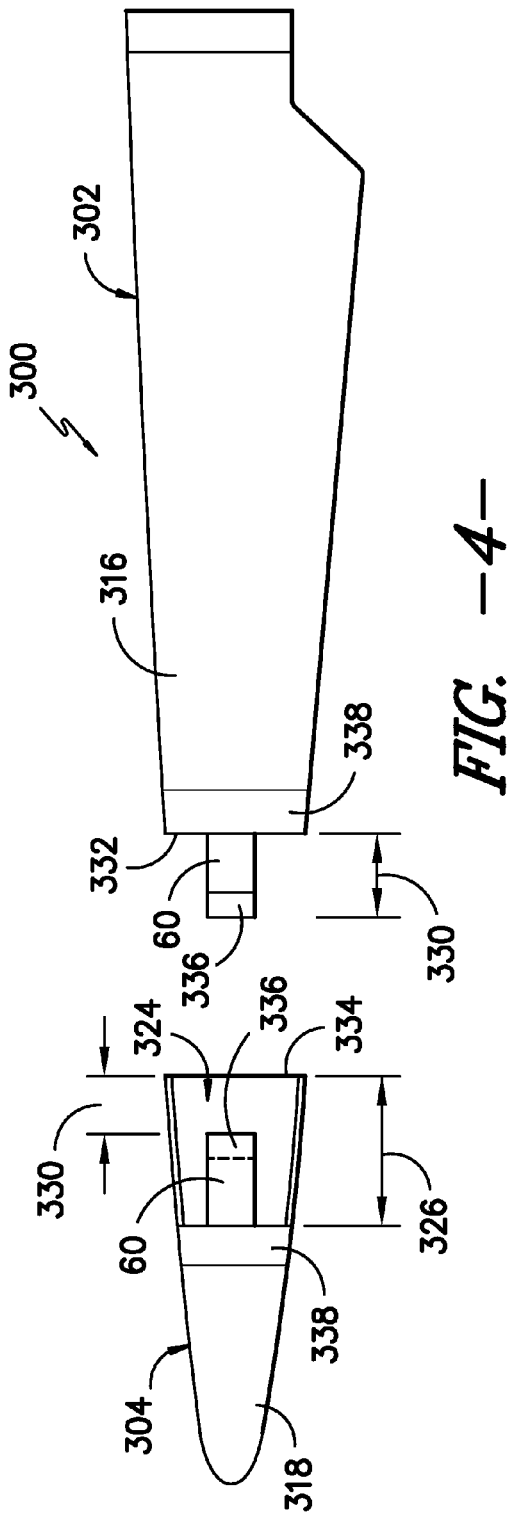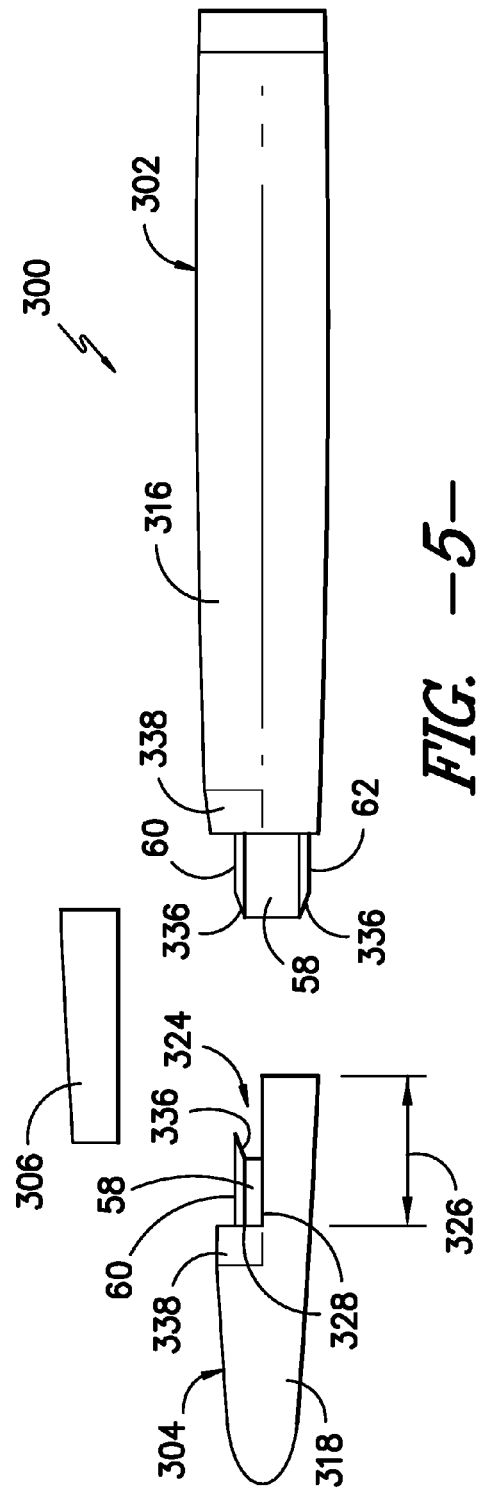

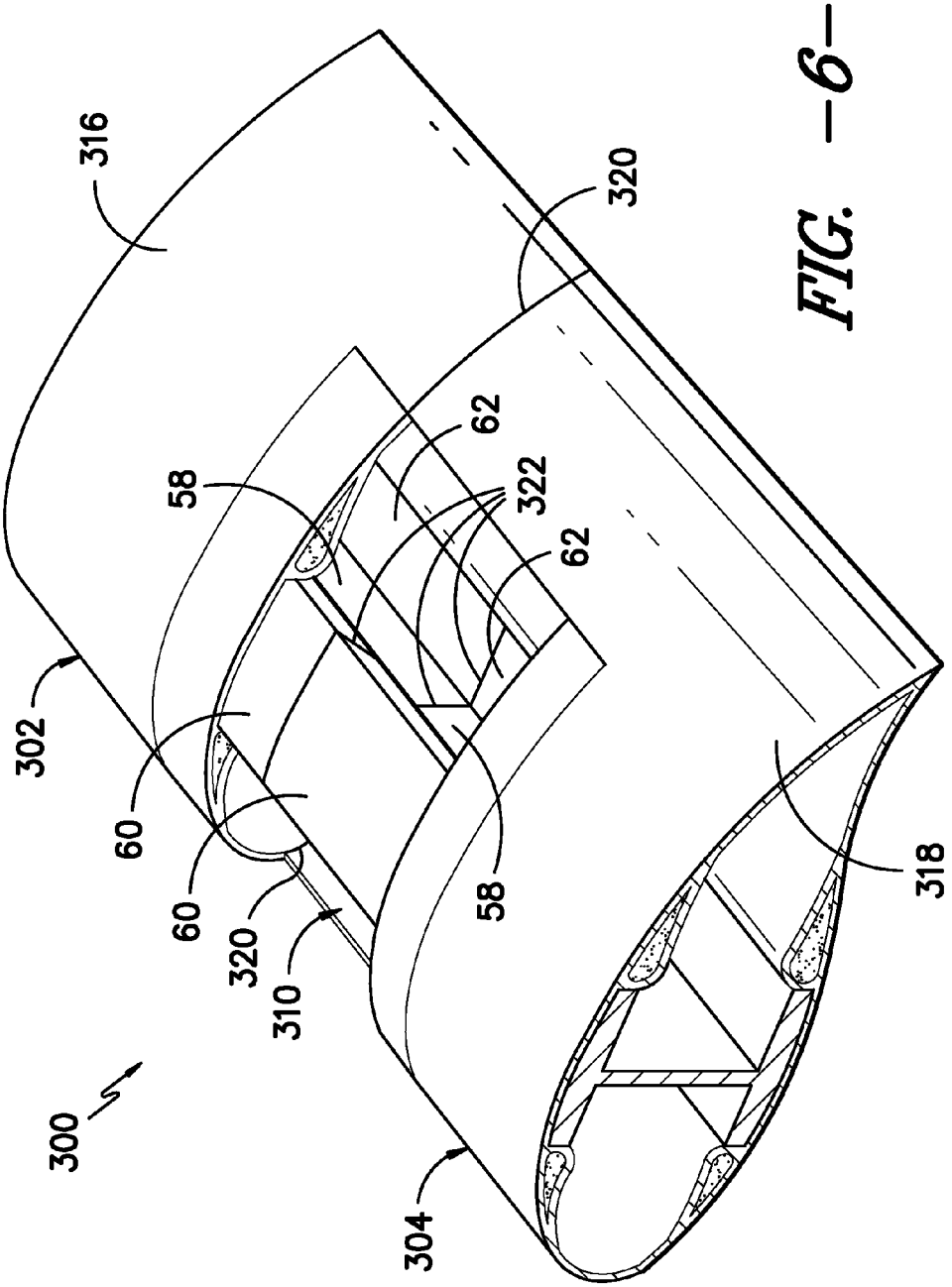
FIG. -6-

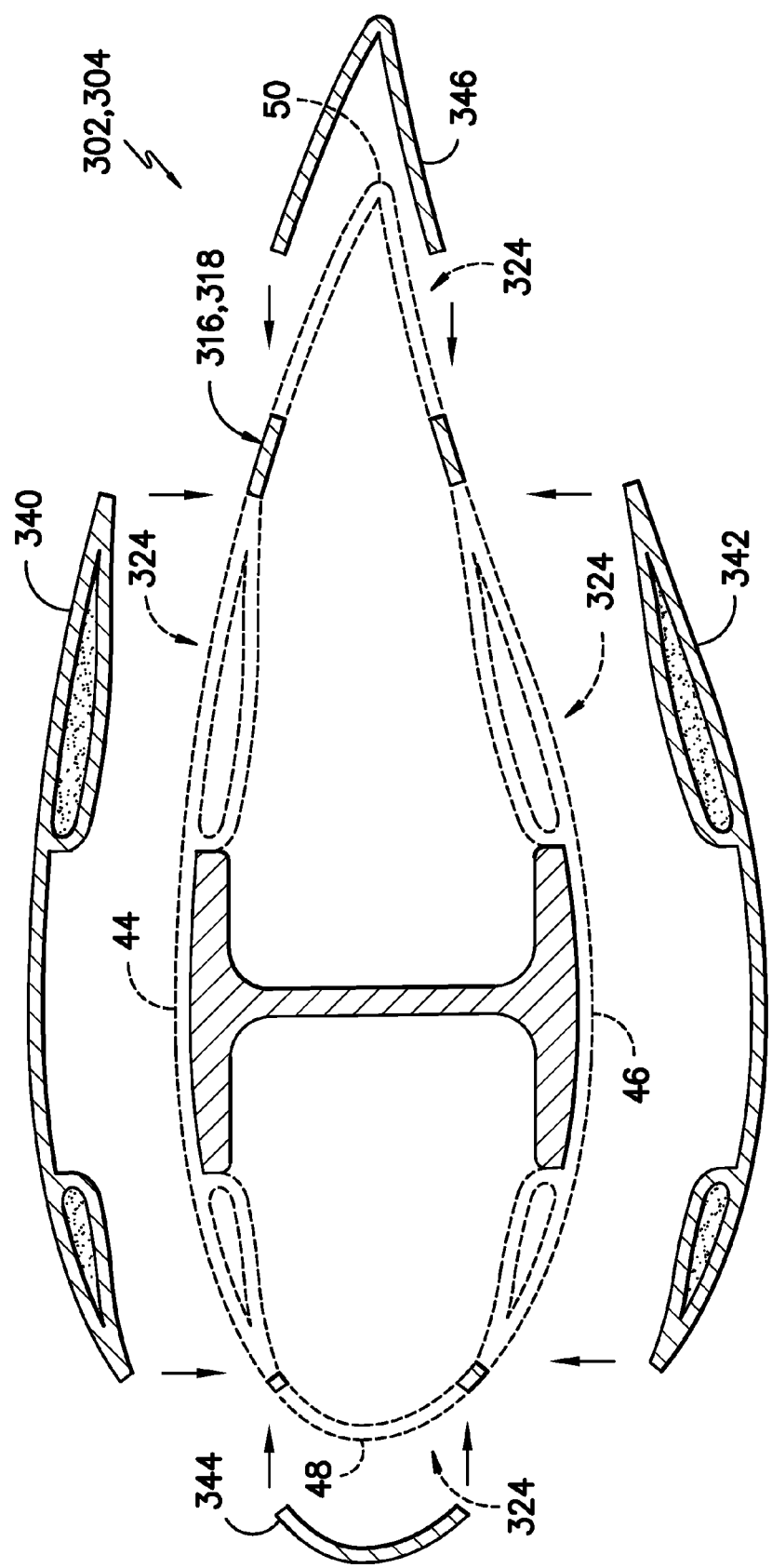
FIG. -7-

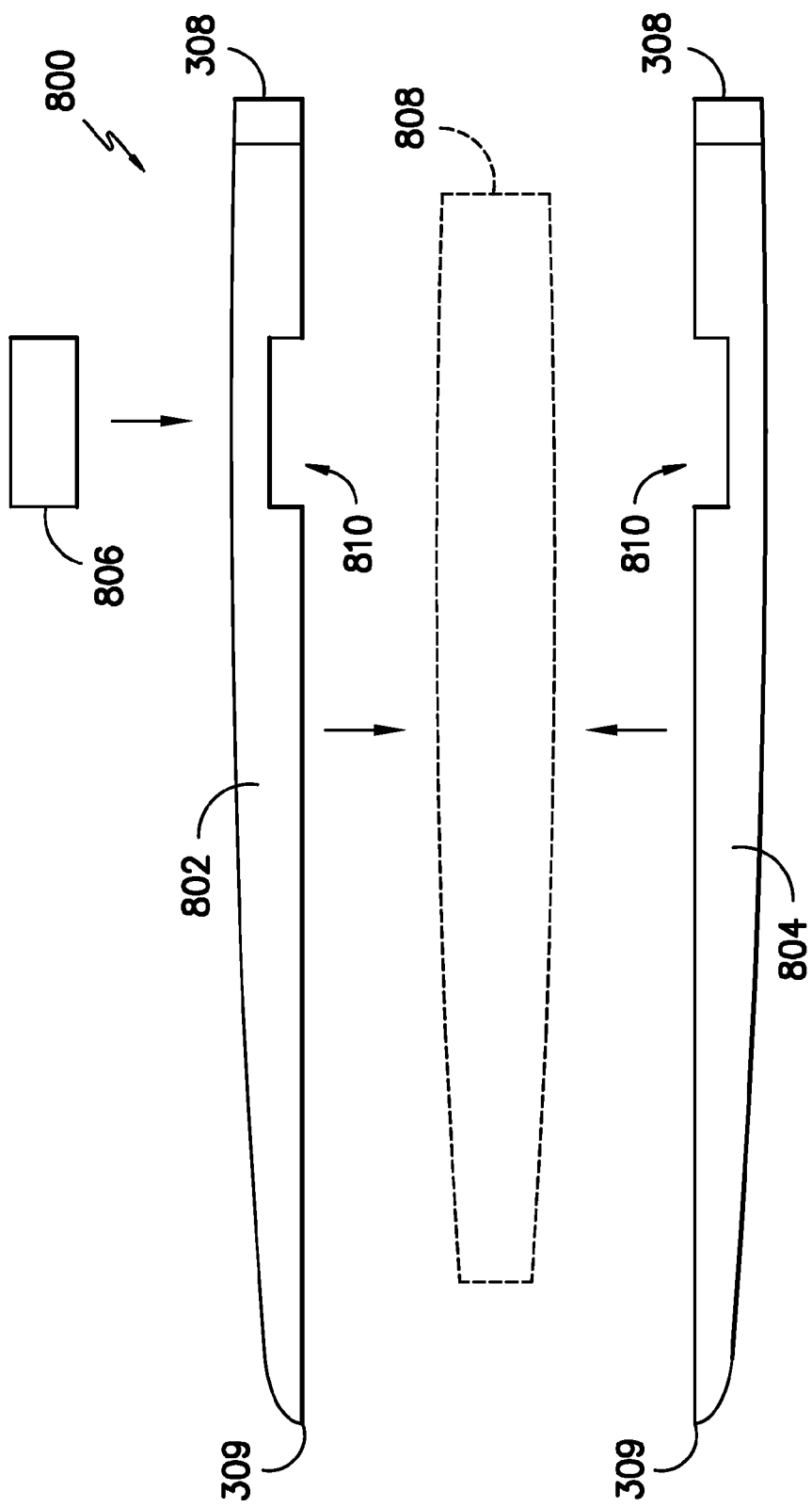
FIG. -8-

WIND TURBINE ROTOR BLADE ASSEMBLY HAVING AN ACCESS WINDOW AND RELATED METHODS

FIELD OF THE INVENTION

The present subject matter relates generally to wind turbine rotor blades and, more particularly, to a rotor blade assembly having an access window that provides access to the interior of the rotor blade assembly.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components and one or more internal structural components, such as spar caps and one or more shear webs. The skin/shell, typically manufactured from layers of fiber composite and/or a lightweight core material, forms the exterior aerodynamic airfoil shape of the rotor blade. The spar caps provide increased rotor blade strength by integrating one or more structural elements running along the length of the rotor blade on both interior sides of the rotor blade. Shear webs are structural beam-like components running essentially perpendicular between the top and bottom spar caps and extending across the interior portion of the rotor blade between the outer skins. Spar caps have typically been constructed from glass fiber reinforced composites, though some larger blades may include spar caps constructed from carbon fiber reinforced composites.

The size, shape, and weight of rotor blades are factors that generally contribute to energy efficiencies of wind turbines. For example, an increase in rotor blade size can increase the energy production of a wind turbine. Thus, to ensure that wind power remains a viable energy power source, efforts have been made to increase energy outputs by increasing the length wind turbine blades. For instance, larger wind turbines may have rotor blades 70 meters in radius and larger.

To allow such larger rotor blades to be manufactured and transported, it is often necessary to form the rotor blades in two or more pieces, which must then be assembled at the wind turbine site. For example, known rotor blade assemblies may be formed as a two-piece construction, having both a fully formed tip piece and a fully formed root piece. Thus, to assemble the tip and root pieces, conventional methods require that both the skin/shell components and internal structural components of the pieces be attached simultaneously. Accordingly, the internal structural components of the pieces are often connected blindly, as physical and visual access to such components is blocked by the outer shell components. With such blind connections, it is often difficult and/or impossible to ensure that the internal structural components of the root piece and the tip piece are connected properly. As such, the structural integrity of the rotor blade, particularly at the interfaces of the tip and root pieces, can be affected. Moreover, because of the blind connection of the internal structural components, it is often the case that excess bonding material, such as excessive amounts of adhesive bonding materials, is used to compensate for the lack of access to the internal joints and/or connections of the rotor blade.

Accordingly, there is a need for a rotor blade assembly that provides access to the interior of the rotor blade during assembly thereof.

BRIEF DESCRIPTION OF THE INVENTION

Aspects and advantages of the invention will be set forth in part in the following description, or may be obvious from the description, or may be learned through practice of the invention.

In one aspect, the present subject matter discloses a rotor blade assembly for a wind turbine. The rotor blade assembly may generally include a root segment and a tip segment. The root segment may include a root shell and an internal root component. The tip segment may be secured to the root segment and may include a tip shell and an internal tip component. Additionally, an access region may be defined in the root shell and/or the tip shell. The access region may generally be configured such that an access window is defined in the rotor blade assembly. Such access window may generally be configured to provide access to the interior of a portion of the rotor blade assembly.

In another aspect, the present subject matter discloses methods for assembling a rotor blade having a root segment and a tip segment. The methods may generally include aligning the root segment and the tip segment such that an access window is defined at an interface of an internal root component and an internal tip component, securing the internal tip component to the internal root component and securing a shell segment over the access window.

In a further aspect, the present subject matter discloses a rotor blade assembly for a wind turbine. The rotor blade assembly may generally include a first shell component, a second shell component and a shell segment. The first shell component may be secured to the second shell component. Additionally, an access region may be defined in the first shell component and/or the second shell component. The access region may generally be configured such that an access window is defined in the rotor blade assembly. The access window may be configured to provide access to the interior of a portion of the rotor blade assembly. Further, the shell segment may be configured to cover the access window.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a wind turbine;

FIG. 2 illustrates a cross-sectional view of an embodiment of a rotor blade;

FIG. 3 illustrates a perspective view of one embodiment of a rotor blade assembly in accordance with aspects of the present subject matter;

FIG. 4 illustrates flap views of embodiments of a tip segment and root segment that may be utilized with the disclosed rotor blade assembly in accordance with aspects of the present subject matter;

FIG. 5 illustrates leading edge views of the embodiments of the tip segment and root segment illustrated in FIG. 4, further illustrating a skin segment that may be utilized with the disclosed rotor blade assembly in accordance with aspects of the present subject matter;

FIG. 6 illustrates a perspective, partial view of the tip segment and the root segment illustrated in FIG. 4 after such segments have been assembled in accordance with aspects of the present subject matter, particularly illustrating the access window defined in the rotor blade assembly;

FIG. 7 illustrates a cross-sectional view of an embodiment of a portion of the rotor blade assembly of the present subject matter, particularly illustrating several locations at which access regions may be formed in the tip segment and/or root segment of the rotor blade assembly in accordance with aspects of the present subject matter; and, FIG. 8 illustrates an exploded edge view of another embodiment of a rotor blade assembly in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is generally directed to a rotor blade assembly which provides access to the interior of a rotor blade during assembly thereof. Generally, in one embodiment, the rotor blade assembly includes a tip segment, a root segment and a shell segment. The rotor blade assembly may be configured such that, during assembly of the root segment and the tip segment, an access window is defined which provides access to the interface of the internal structural components of the tip and root segments. Such access may include visual access to the interface of the internal structural components. The access provided by the access window may also include physical access so that a service worker(s) may reach, bend and/or climb into the interior of the rotor blade assembly. As such, it can be ensured that the various internal components of the rotor blade assembly are properly secured to one another. Additionally, because of the access window, material costs may be reduced as service workers need not overcompensate for the lack of visual access by applying excess adhesive or other bonding materials to the joints, seams and/or other internal connections of the rotor blade assembly.

Moreover, it should be appreciated that, although the disclosed rotor blade assembly is generally described herein as an assembly for forming a complete rotor blade, the disclosed assembly components and methods may also be utilized in repair scenarios. For example, in a situation in which the tip of a rotor blade is being replaced due to damage or for any other reason, a tip segment similar to that described below may be utilized as the replacement tip. As such, an access window may be provided to the repair workers so that it can be ensured that the new blade tip is properly secured to the remainder of the rotor blade. Furthermore, the disclosed rotor blade assembly may also provide advantages in situations in which a rotor blade must be formed from two or more pieces for purposes of transportation and, thus, must be subsequently assembled at the wind turbine site. In particular, the assembly components described herein may allow for the simple and efficient assembly of a rotor blade at any suitable location.

Referring now to the drawings, FIG. 1 illustrates a perspective view of a wind turbine 10. As shown, the wind turbine 10 is a horizontal-axis wind turbine. However, it should be appreciated that the wind turbine 10 may be a vertical-axis wind turbine. In the illustrated embodiment, the wind turbine 10 includes a tower 12 that extends from a support surface 14, a nacelle 16 mounted on top of the tower 12, and a rotor 18 that is coupled to the nacelle 16. The rotor 18 includes a rotatable hub 20 and at least one rotor blade 22 coupled to and extending outward from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel so as to define a cavity (not illustrated) between the support surface 14 and the nacelle 16. In an alternative embodiment, the tower 12 may be any suitable type of tower having any suitable height.

The rotor blades 22 may generally have any suitable length that enables the wind turbine 10 to function as described herein. For example, in one embodiment, the rotor blades 22 may have a length ranging from about 15 meters (m) to about 90 m. However, other non-limiting examples of blade lengths may include 15 in or less, 20 m, 37 m or a length that is greater than 90 m. Additionally, the rotor blades 22 may be spaced about the hub 20 to facilitate rotating the rotor 18 to enable kinetic energy to be transferred from the wind into usable mechanical energy, and subsequently, electrical energy. Specifically, as wind strikes rotor blades 22 from a direction 28, rotor 18 is rotated about an axis of rotation 30. The hub 20 may be rotatably coupled to an electric generator (not illustrated) positioned within the nacelle 16 to permit electrical energy to be produced. Further, the rotor blades 22 may be mated to the hub 20 by coupling a blade root portion 24 to the hub 20 at a plurality of load transfer regions 26. Thus, any loads induced to the rotor blades 22 are transferred to the hub 20 via the load transfer regions 26.

As shown in the illustrated embodiment, the wind turbine 10 may also include a turbine control system or turbine controller 36 centralized within the nacelle 16. However, it should be appreciated that the controller 36 may be disposed at any location on or in the wind turbine 10, at any location on the support surface 14 or generally at any other location. The controller 36 may generally be configured to control the various operating modes of the wind turbine 10 (e.g., start-up or shut-down sequences) and may also be configured to issue control commands to the various components of the wind turbine 10.

Referring now to FIG. 2, there is illustrated a cross-sectional view of an embodiment of a rotor blade 22. As shown, the rotor blade 22 generally includes an outer shell 40 that serves as the body or outer casing/covering of the rotor blade 22. The outer shell 40 may generally include an interior surface 42 defining the inner volume of the rotor blade 22 and an exterior surface serving as the outer skin of the rotor blade 22 and defining the pressure and suction sides 44, 46 of the blade 22. Additionally, as shown in FIG. 2, the outer shell 40 is formed as a single shell component. However, it should be appreciated that the outer shell 40 may also be formed from multiple shell components. For example, as shown in FIG. 8, the other shell 40 may be manufactured from a top shell component generally defining the pressure side 44 of the rotor blade 22 and a bottom shell component generally defining the suction side 46 of the rotor blade 22, with such shell components being secured to another at the leading and trailing edges 48, 50 of the rotor blade 22.

In general, the outer shell 40 of the rotor blade 22 may be formed from any suitable material known in the art. For example, in one embodiment, the shell 40 may be formed entirely from a composite laminate material, such as a carbon fiber-reinforced composite or a glass fiber-reinforced composite. Additionally, as shown in the illustrated embodiment, a portion of the outer shell 40 may be configured as a layered construction and may include a core 52 formed from a lightweight material, such as wood (e.g., balsa), foam or a combination of such materials. For instance, the core 52 may be disposed between interior and exterior skin layers 54, 56 of the outer shell 40, with such layers 54, 56 being formed from any suitable fiber-reinforced composite.

Still referring to FIG. 2, the rotor blade 22 may also include one or more internal structural components, such as at least one shear web 58 positioned between top and bottom spar caps 60, 62. The shear web(s) 58 and spar caps 60, 62 may generally serve as beam-like components for providing structural rigidity and increased strength to the rotor blade 22. In general, the spar caps 60, 62 may extend longitudinally within the rotor blade 22 and may be secured (e.g., by adhesive bonding) to an inner surface 42 of the shell 40. The shear web(s) 58 may generally be configured as a longitudinally extending cross-beam which may be secured (e.g., by adhesive bonding) substantially perpendicularly between the top and bottom spar caps 60, 62. It should be appreciated that the spar caps 60, 62 and shear web(s) 58 may be formed of any suitable material that permits such components to function as described herein. For example, in one embodiment, the spar caps 60, 62 may be formed from a composite material, such as a unidirectional glass fiber-reinforced composite, and the shear web(s) 58 may be formed from foam, wood or a similar lightweight material strengthened with a fiber-reinforced composite.

Referring now to FIG. 3, a perspective view of one embodiment of a rotor blade assembly 300 is illustrated in accordance with aspects of the present subject matter. As shown, the rotor blade assembly 300 generally includes a root segment 302, a tip segment 304, and a shell segment 306. The segments 302, 304, 306 of the rotor blade assembly 300 may generally be configured such that, when assembled, a complete rotor blade having a substantially continuous aerodynamic profile is defined. Thus, the root segment 302 may include a root portion 308 configured to be mounted to the hub 20 (FIG. 1) of a wind turbine. Similarly, the tip segment 304 may define a blade tip 309 disposed opposite the root portion 308. Additionally, the root segment 302 and/or the tip segment 304 may be configured such that an access window 310 is defined in the rotor blade assembly 300. Such access window 310 may generally be configured to provide access to the interior of the rotor blade, such as at the interface 322 of the internal components of the rotor blade assembly 300 (e.g., internal structural components 312, 314). Further, the shell segment 306 may generally be configured to cover the access window 310 such that a complete rotor blade assembly is achieved.

In general, the root segment 302 and the tip segment 304 of the rotor blade assembly 300 may each include an outer shell and at least one internal structural component. Specifically, as shown in FIG. 3, the root segment 302 may include a root shell 316 and an internal structural component 312. Similarly, the tip segment 304 may include a tip shell 318 and an internal structural component 314. Each shell 316, 318 may generally be configured similarly to the outer shell 40 described with reference to FIG. 2. Thus, the root and tip shells 316, 318 may generally serve as the body or outer casing for its respective segment 302, 304 and may be formed from any suitable material(s), such as one or more composite laminate material(s) or a combination of a composite material(s) and a core material(s). Additionally, as will be described in greater detail below with reference to FIGS. 4-6, at least one of the shells 316, 318 may define an access region 324 such that an access window 310 is defined in the rotor blade assembly 300 for providing access to the interior of the assembly 300.

Moreover, as shown in FIG. 3, the shells 316, 318 may be configured to be secured to one another (e.g., by adhesive bonding) at a shell seam or interface 320 such that the rotor blade assembly generally defines a substantially continuous aerodynamic profile. Additionally, in one embodiment, the shells 316, 318 may define one or more attachment features (not illustrated), such as corresponding beveled edges or mating key features (e.g., tongue and groove features), to facilitate attachment of the root shell 316 to the tip shell 318. In addition to such attachment features or an alternative thereto, an overlaminate may be applied at the shell interface 320 to ensure a smooth aerodynamic transition between the root shell 316 and the tip shell 318. For example, the overlaminate may be applied using a wet lay-up process, wherein one or more plies (including a reinforcement material such as glass or carbon fibers) are positioned at the shell interface 320 and a resin or other suitable matrix material is rolled over or otherwise applied to the surface of the plies to form a smooth profile at the interface 320.

The internal structural components 312, 314 of the root and tip segments 302, 304 may generally be configured to provide increased strength and/or stiffness to the rotor blade assembly 300. Thus, it should be appreciated that the internal structural components 312, 314 may comprise any suitable structural and/or framing member(s) known in the art that may be utilized to provide structural support to the segments 302, 304. For example, in one embodiment, the internal structural components 312, 314 of the root and tip segments 302, 304 may comprise a pair of spar caps 60, 62 and a corresponding shear web 58, each of which may generally be configured as described above with reference to FIG. 2. Additionally, as shown in FIG. 3, the internal structural components 312, 314 may be configured to be secured to one another at an internal interface 322 of the rotor blade assembly 300. For instance, such components 312, 314 may be bonded together (e.g., by adhesive bonding) or may be secured together using any other suitable fastening means, such as by using screws, bolts, a tongue and groove fit, interference fit, brackets or using any other suitable dry-fit attachment mechanism and/or method.

Still referring to FIG. 3, the shell segment 306 of the rotor blade assembly 300 may generally be configured to serve as a cover piece for patching the access window 310 defined at the interface of the root and tip segments 302, 304. Thus, the shell segment 306 may generally comprise any suitable prefabricated skin or shell component that is shaped or otherwise configured so as to both cover the access window 310 and correspond to the generally aerodynamic shape and/or profile of the root segment 302 and the tip segment 304. As such, when the shell segment 306 is secured to the root and/or tip shell 316, 318 (e.g., by bonding the shell segment 306 around the perimeter of the access window 310), the rotor blade assembly 300 may generally define a substantially continuous aerodynamic profile. Moreover, it should be appreciated that, similar to the shell interface 320, an overlaminate may be applied around the perimeter of the shell segment 306, such as by using a wet lay-up process, to ensure a smooth aerodynamic transition between the shell segment 306 and the root and tip shells 316, 318.

It should also be appreciated that the shell segment 306 may generally be formed from any suitable material. However, in several embodiments, the shell segment may be formed from the same or a substantially similar material as the root and tip shells 316, 318, such as one or more composite laminate material(s) or a combination of a composite material(s) and a core material(s).

Referring now to FIGS. 4 and 5, edge and flap views of embodiments of a root segment 302 and a tip segment 304 that may be utilized with the disclosed rotor blade assembly 300 are illustrated in accordance with aspects of the present subject matter. In particular, FIG. 4 illustrates a flap view of one embodiment of the pressure side 44 (FIG. 2) of both the root segment 302 and tip segment 304. FIG. 5 illustrates a leading edge view of the root segment 302 and tip segment 304 depicted in FIG. 4 and also illustrates an embodiment of a shell segment 306 that may be used to complete the rotor blade assembly 300.

As indicated above, the root segment 302 and the tip segment 304 of the rotor blade assembly 300 may generally include an outer shell 316, 318 and one or more internal structural components, such as a pair spar caps 60, 62 (only one of which can be seen on the tip segment 304) and a shear web(s) 58 extending between the spar caps 60, 62. In addition, as shown in FIGS. 4 and 5, the tip shell 318 may define an open area or access region 324 in an area of the shell 318 substantially adjacent to the location at which the internal structural components 58, 60, 62 and/or the tip shell 318 of the tip segment 304 are configured to be secured to the internal structural components 58, 60, 62 and/or the root shell 316 of the root segment 302. Thus, when the root and tip segments 302, 304 are assembled together, an access window 310 (FIG. 3) may be defined between the segments 302, 304. As used herein, the term "access region" may generally refer to any feature defined/formed in and/or removed from the tip shell 318 and/or the root shell 316 that provides access to a portion of the interior of the rotor blade assembly 300, such as in an area substantially adjacent to the shell and/or internal interface locations 320, 322 (FIG. 3) of the root and tip segments 302, 304. Accordingly, it should be appreciated that, although the access region 324 is shown as being defined solely in the tip shell 318 of the tip segment 304, the access region 324 may also be defined solely in the root shell 316 of the root segment 302 or access regions 324 may be defined in both the root shell 316 and tip shell 318.

As shown in FIGS. 4 and 5, the access region 324 may generally comprise any opening or removed area defined and/or formed in the skin/shell of the tip shell 318 which may have any suitable length 326. Thus, when the segments 302, 304 are assembled together, an access window 310 may be defined in the rotor blade assembly having a length 326. Additionally, as shown in FIG. 5, the access region 324 is generally defined by substantially straight edges 328 such that the region 324 comprises an arced, rectangular-shaped opening in the tip shell 318. However, it should be appreciated that, in the alternative embodiments, the tip shell 318 (or, in some cases, the root shell 316 or a combination of both shells 316, 318) may generally be formed so that the access region 324 defines any suitable shape and/or has any suitable configuration that permits access to the interior of the rotor blade assembly 300. For example, the tip shell 318 may be formed having curved edges in the area of the access region 324 such that a rounded or curved opening is defined in the tip shell 318. Moreover, as will be described in greater detail below with reference to FIG. 7, the access region 324 need not be formed on the pressure side 44 (FIG. 2) of the tip shell 318 and/or the blade shell 316 as shown in FIGS. 4 and 5. For example, the access region 324 may be formed on the suction side 46, at the leading edge 48, at the trailing edge 50 or across two or more of such areas of the rotor blade assembly 300.

Referring still to FIGS. 4 and 5, in one embodiment, the internal structural components (e.g., the spars caps 60, 62 and corresponding shear web(s) 58) of the segments 302, 304 may be configured such that, when assembled, the internal interface 322 (FIG. 3) of the internal structural components 58, 60, 62 is disposed at a different longitudinal position than the shell interface 320 (FIG. 3) of the shells 316, 318. For example, as shown in FIG. 4, the root segment 302 may be configured such that its internal structural components 58, 60, 62 extend outwardly a length 330 from the end 332 of the root shell 316, which may correspond to the length 330 between the end of the internal structural components 58, 60, 52 of the tip shell 318 and the end 334 of the tip shell 318. As such, the shell interface 320 (FIG. 3) of the rotor blade assembly 300 may be disposed a length 330 from the internal interface 322 (FIG. 3). It should be appreciated that, in alternative embodiments, the internal structural components 58, 60, 62 of the tip segment 304 may be substantially aligned with the end 334 of the tip shell 318 and the internal structural components 58, 60, 62 of the root segment 304 may be substantially aligned with the end 332 of the root shell 316 such that the internal interface 322 (FIG. 3) of the rotor blade assembly 300 is disposed at substantially the same location as the shell interface 320 (FIG. 3). However, it should also be appreciated that the interface locations 320, 322 of the rotor blade assembly 300 may generally be disposed at any suitable location relative to the access window 310 such that access may be provided to such locations. Further, it should be appreciated that similar configurations to those described above may be utilized when the access region 324 is defined solely in the root shell 316 or in both the root shell 316 and tip shell 318 as opposed to being defined solely in the tip shell 318.

The internal structural components 58, 60, 62 of the tip and root segments 302, 304 may also include one or more attachment features for facilitating attachment or assembly of such components to one another. For example, as shown in FIGS. 4 and 5, the spar caps 60, 62 for each segment 302, 304 may define corresponding beveled edges 336 such that a portion of the spar caps 60, 62 of the root segment 302 may be received within a portion of the spar caps 60, 62 for the tip segment 304 or vice versa. Other suitable attachment features that may be included on the internal structural components 58, 60, 62 should be readily apparent to those of ordinary skill in the art. For example, in another embodiment, the internal structural components 58, 60, 62 may include corresponding tongue and groove configurations or a similar keyed configuration.

Referring particularly to FIG. 5, as indicated above, the shell segment 306 may generally be configured to fit over or otherwise cover the access window 310 (FIG. 3) formed during assembly of the root and tip segments 302, 304. Thus, it should be appreciated that the shell segment 306 may generally define any shape and/or profile which corresponds to the aerodynamic shape and/or profile of the rotor blade assembly 300 (particularly the root and tip shells 316, 318) in the location at which the shell segment 306 is being secured over the access window 310 (FIG. 3). As such, when the shell segment 306 is secured over the access window 310, a substantially continuous aerodynamic shape and/or profile may be achieved. It should be appreciated that the shell segment 306 may generally be secured to the root and/or tip segments 302, 304 using any suitable means. For example, in one embodiment, the shell segment 306 may be bonded to the root and/or tip shells 316, 318, such as by using any suitable adhesive bonding material. Alternatively, the shell segment 306 may be attached to the root and/or tip shells 316, 318 using any other suitable fastening means, such as by using screws, bolts, a tongue and groove fit, interference fit, brackets or using any other suitable dry-fit attachment mechanism and/or method. Additionally, in one embodiment, the shell segment 306 may be removably secured or attached to the root and/or tip shells 316, 318 such that the shell segment 306 may be removed from the blade assembly 300 at any time to make repairs, to check the internal connections of the assembly 300 and/or to perform any other suitable action.

Moreover, the shell segment 306 may include any suitable attachment features (not illustrated), such as beveled or knife edges, to facilitate attachment of the shell segment 306 to the root and tip segments 302 and 304. Additionally, the tip and/or root shells 316, 318 may also define one or more attachment features. For example, as shown in FIG. 5, the tip and root shells 316, 318 may define an angled or recessed portion 338 configured to receive corresponding angled or recessed portions (not illustrated) of the shell segment 306. One of ordinary skill in the art should appreciate that various other suitable attachment features, such as a keyed attachment features (e.g., tongue and groove connections), may also be included on the shell segment 306 and/or the tip and root shells 316, 318 to facilitate attachment between such components.

Referring now to FIG. 6, there is illustrated a perspective partial view of the root and tip segments 302, 304 illustrated in FIGS. 4 and 5, particularly illustrating such segments 302, 304 as assembled. As shown, upon assembly of the tip and root segments 302 304, an access window 310 may be defined in the rotor blade assembly 300 due to the access region 324 (FIGS. 4 and 5) formed in the tip shell 318 and/or the root shell 316. As described above, the access window 310 may generally be configured to provide access to the interior of the rotor blade assembly 300. For example, in one embodiment, the access window 310 may be configured to provide visual access to the interior of the assembly 300 such that the shell and/or internal interfaces 320, 322 of the shells 316, 318 and/or internal structural components 58, 60, 62 of the tip and root segments 302, 304 may be visually assessed to ensure that such components are properly secured to one another. In addition to visual access, the access window 310 may also be configured to provide physical access into the interior of the rotor blade assembly 300. Accordingly, service workers may be allowed, depending on the size of the access window 310 (e.g., depending, in part, on the length 326 (FIGS. 4 and 5)), to reach, bend and/or climb into the interior of the rotor blade assembly 300 through the access window 310 to ensure proper attachment of the tip segment 302 to the root segment 304. For instance, the access window 310 may enable service workers to precisely apply a sufficient amount of adhesive between the internal structural components (e.g., at the interfaces 322 of the spar caps 60, 62 and the shear webs 58) and/or at the interface 320 of the shells 316, 318, thereby ensuring proper bonding between the components and also potentially decreasing material costs by eliminating the use of excessive adhesive bonding material. Alternatively, the access window 310 may enable such components to be quickly and easily fastened to one another using any other suitable means, such as by using screws, bolts, brackets or any other suitable dry-fit attachment mechanism known in the art. Once such components of the segments 302, 304 are properly secured, the shell segment 306 may then be secured over the access window 310 to finish the assembly and thereby define a complete rotor blade.

Referring now to FIG. 7, there is illustrated a cross-sectional view of one embodiment of a portion or segment (i.e., the root segment 302 or the tip segment 304) of the disclosed rotor blade assembly 300, particularly illustrating the various locations at which the access regions 324 may be formed in the segment(s) 302, 304. For example, similar to the embodiment described above with reference to FIGS. 3-6, the access region 324 may be formed on the pressure side 44 of the root and/or tip shell 316, 318 such that the shell segment 306 of the disclosed rotor blade assembly 300 comprises a pressure side skin/shell component 340. Alternatively, the access region 324 may be formed on the suction side 46 of the root and/or tip shell 316, 318 such that the shell segment 306 comprises a suction side skin/shell component 342. In other embodiments, the access region 324 may be formed in the area of the leading edge 48 or trailing edge 50 of the root and/or tip shell 316, 318 such that the shell segment 306 comprises a leading edge component 344 or trailing edge component 346, respectively. In even further embodiments, the access region 324 may be formed across several areas of the root and/or tip shell 316, 318. For example, in one embodiment, the access region may extend from the pressure side 44 of the shell 316, 318 to the suction side 46 across either the leading or trailing edge 48, 50. In such an embodiment, the shell segment 306 may define a corresponding shape and/or profile so that the shell segment 306 may extend from the pressure side 44 to the suction side 46 and thereby cover the access window 310 formed by the access region 324. Similarly, in yet another embodiment, the access region 324 may extend around the entire perimeter of the shell 316, 318 such that the shell segment 306 is configured to define a full cross-sectional shape and/or profile of the rotor blade assembly 300. It should be appreciated that, in the several embodiments (particularly those in which the access region 324 is formed across several portions of the root and/or tip shell 316, 318), the shell segment 306 may be manufactured in two or more components configured to be secured to one another so as to cover the access window 310 formed by the access region 324.

It should be readily appreciated by those ordinary skill in the art that, in several embodiments of the present subject matter, the disclosed root and tip segments 302, 304 may each be formed from two or more sub-segments. For example, the root segment 302, itself, may be a multi-piece assembly, including two or more longitudinally extending blade sub-segments secured to one another so as to form the root segment 302. In such an embodiment, is should be readily appreciated that sub-segments of the root segment 302 may be configured similarly to the root and tip segments 302, 304 described above. For instance, the sub-segments, when assembled, may define an access window(s) 310 such that access is provided to the internal interface of the sub-segments. Moreover, it should also be appreciated that the access window 310 and internal interfaces of the root and tip segments 302, 304 may generally be disposed at any location along the length of the rotor blade assembly 300. For example, in one embodiment, the access window/interface may be disposed substantially adjacent to the tip 309 of the rotor blade assembly 300. Alternatively, the access window/interface may be disposed substantially adjacent to the root portion 308 of the assembly 300 or at any suitable location between the tip 309 and root portion 308.

Referring now to FIG. 8, an exploded edge view of another embodiment of a rotor blade assembly 800 is illustrated in accordance with aspects of the present subject matter. The rotor blade assembly 800 generally includes a pressure side shell component 802, a suction side shell component 804 and a shell segment 806. Each shell component 802, 804 may generally be configured similarly to the outer shell 40 described above with reference to FIG. 2. Thus, pressure and suction side shell components 802, 804 may generally serve as the body or outer casing of the rotor blade assembly 800 and may be formed from any suitable material(s), such as one or more composite laminate material(s) or a combination of a composite material(s) and a core material(s). Additionally, as shown, the shell components 802, 804 may be configured to encompass one or more internal components 808 of the rotor blade assembly 800, such as a pair spar caps and an associated shear web. Further, the shell components 802, 804 may also be configured to extend along the entire length of the rotor blade assembly 800, such as from the root portion 308 to the tip 309. Accordingly, when the pressure side shell component 802 is secured to the suction side shell component 802, the rotor blade assembly 800 may generally define the shape and/or profile of a rotor blade.

Moreover, as shown in FIG. 8, each of the shell components 802, 804 may be configured so as to define an open area or access region 810. Thus, when the shell components 802, 804 are secured or otherwise assembled together, an access window, similar to the access window 310 described above with reference to FIGS. 3 and 6, may be defined in the rotor blade assembly 800 between the shell components 802, 804. This access window may generally be configured to provide visual and/or physical access to the interior volume of the rotor blade assembly 800. As such, service workers may be allowed to look, reach, bend and/or climb into the interior of the rotor blade assembly 800 to ensure proper attachment of the shell components 802, 804 to one another. For instance, the access window may enable service workers to precisely apply a sufficient amount of adhesive at the interface of the shell components 802, 804 and/or at the interface of the internal components 808 and one or more of the shell components 802, 804, thereby ensuring proper bonding between the components and also potentially decreasing material costs by eliminating the use of excessive adhesive bonding material. Once the shell components 802, 804 are properly secured to one another, the shell segment 806 may then be secured over the access window to finish the assembly 800 and thereby define a complete rotor blade having a substantially aerodynamic profile.

It should be appreciated that, although the access region 810 forming the access window is shown in FIG. 8 as being defined across both the pressure and suction side shell components 802, 804, the access region 810 may also be defined entirely in one of the shell components 802, 804. It should also be appreciated that the access region(s) 810 may be defined at any suitable location along the length and/or perimeter of the rotor blade assembly 800 so as to provide an access window into the interior of the assembly 800. Moreover, in alternative embodiments, multiple access regions 810 may be defined in the pressure side and/or suction side shell components 802, 804 such that a plurality of access windows are formed along the length and/or perimeter of the rotor blade assembly 800. In such an embodiment, it should be appreciated that a plurality of shell segments 806 may also be provided to cover the plurality of access windows.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade assembly for a wind turbine, the rotor blade assembly comprising:
   a root segment comprising a root shell and an internal root component;
   a tip segment configured to be secured to the root segment, the tip segment comprising a tip shell and an internal tip component; and,
   an access region defined in at least one of the root shell and the tip shell, the access region being configured such that an access window is defined at an interface between the root shell and the tip shell;
   wherein the access window is configured to provide access to the interior of a portion of the rotor blade assembly.

2. The rotor blade assembly of claim 1, further comprising a shell segment configured to cover the access window.

3. The rotor blade assembly of claim 2, wherein the access region is formed on a pressure side of at least one of the root shell and the tip shell such that the shell segment is configured as a pressure side skin component.

4. The rotor blade assembly of claim 2, wherein the access region is formed on a suction side of at least one of the root shell and the tip shell such that the shell segment is configured as a suction side skin component.

5. The rotor assembly blade of claim 2, wherein the access region is formed at a leading edge of at least one of the root shell and the tip shell such that the shell segment is configured as a leading edge component.

6. The rotor blade assembly of claim 2, wherein the access region is formed at a trailing edge of at least one of the root shell and the tip shell such that the shell segment is configured as a trailing edge component.

7. The rotor blade assembly of claim 2, wherein the shell segment is secured to the root shell and the tip shell such that a substantially continuous aerodynamic profile is defined by the rotor blade assembly.

8. The rotor blade assembly of claim 7, wherein an over-laminate is disposed around the perimeter of the shell segment so as to define a smooth aerodynamic transition between the shell segment and the tip and root shells.

9. The rotor blade assembly of claim 1, wherein an over-laminate is disposed at an interface of the tip shell and root shell so as to define a smooth aerodynamic transition between the tip segment and the root segment.

10. The rotor blade assembly of claim 1, wherein the internal root component and the internal tip component each comprise a pair of spar caps and at least one shear web extending between the spar caps.

11. The rotor blade assembly of claim 1, wherein the access window is configured to provide access to an interface of the internal root component and the internal tip component.

12. The rotor blade assembly of claim 11, wherein the access window is configured to provide physical access to the interface of the internal root component and the internal tip component.

13. A method for assembling a rotor blade having a root segment including a root shell and an internal root component and a tip segment including a tip shell and an internal tip component, the method comprising:

aligning the root segment and the tip segment such that an access window is defined at an interface between the tip shell and the root shell;

securing the internal tip component to the internal root component; and, securing a shell segment over the access window.

14. The method of claim 13, further comprising securing the tip shell to the root shell.

15. The method of claim 14, further comprising applying an overlaminate at the interface of the tip shell and the root shell.

16. The method of claim 13, further comprising applying an overlaminate around the perimeter of the shell segment.

17. The method of claim 13, wherein the internal root component and the internal tip component each comprise a pair of spar caps and at least one shear web extending between the spar caps.

18. A rotor blade assembly for a wind turbine, the rotor blade assembly comprising:

a first shell component;

a second shell component configured to be secured to the first shell component;

an access region defined in at least one of the first shell component and the second shell component, the access region being configured such that an access window is defined at an interface between the first shell component and the second shell component; and, a shell segment configured to cover the access window, wherein the access window is configured to provide access to the interior of a portion of the rotor blade assembly.

19. The rotor blade assembly of claim 18, wherein the first shell component comprises a pressure side shell component and the second shell component comprises a suction side shell component.

20. The rotor blade assembly of claim 18, wherein the first shell component comprises a tip shell and the second shell component comprises a root shell.

* * * * *